July 13, 1943.  R. W. HOAG  2,324,151
FOLDING BOX
Filed Feb. 17, 1940  4 Sheets-Sheet 1
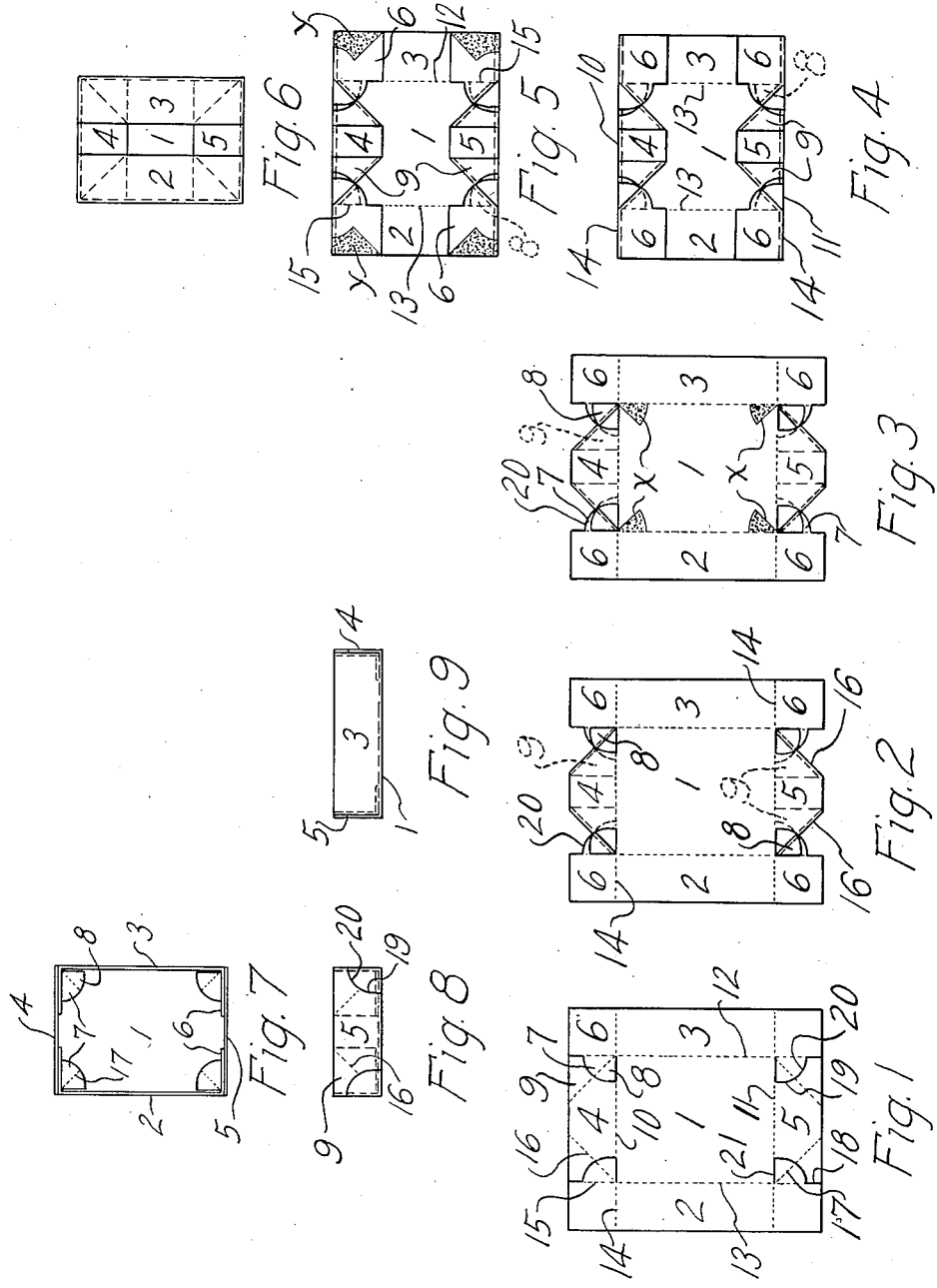
Inventor
Roderick Wm Hoag July 13, 1943. R. W. HOAG 2,324,151
FOLDING BOX
Filed Feb. 17, 1940 4 Sheets-Sheet 2
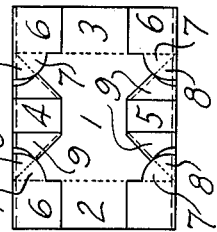
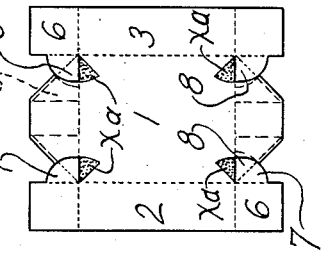
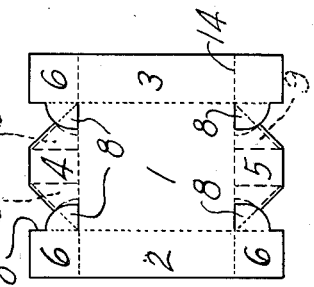
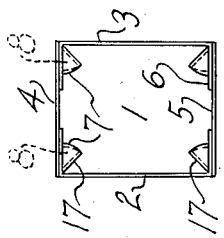
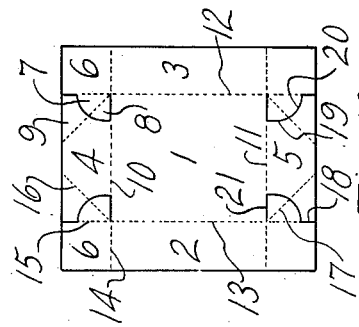
Inventor
Roderick Wm Hoag July 13, 1943.   R. W. HOAG   2,324,151
FOLDING BOX
Filed Feb. 17, 1940   4 Sheets-Sheet 3
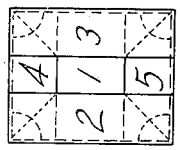
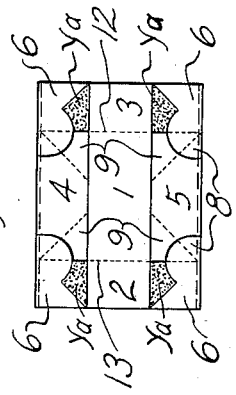
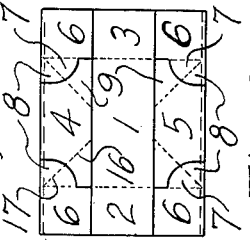
Fig. 23   Fig. 22   Fig. 21
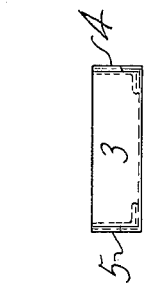
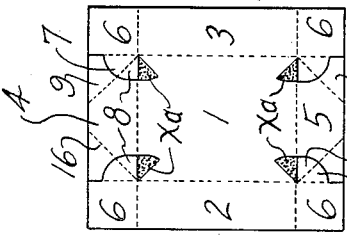
Fig. 26   Fig. 20
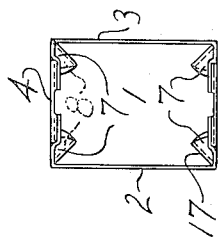
Fig. 24   Fig. 25   Fig. 19
Inventor
Roderick Wm Hoag Patented July 13, 1943

2,324,151

UNITED STATES PATENT OFFICE 2,324,151

FOLDING BOX

Roderick W. Hoag, Melrose, Mass.

Application February 17, 1940, Serial No. 319,431

2 Claims. (Cl. 229—32)

This invention relates to improvements in folding boxes of the type which automatically lock the walls thereof in upright position upon being brought to such position.

One object of this invention is to provide a folding box having locking elements at each corner thereof connecting the walls with the bottom of the box to hold the walls in upright position when the box is erected.

Another object of my invention is to provide a folding box of the type which automatically locks the walls thereof in upright position by means of locking elements integral with the walls thereof and secured to the bottom surface of the box.

With said objects in view, and others hereinafter explained, my invention consists in the folding box and method of making the same, substantially as hereinafter described and claimed.

Of the accompanying drawings:

Figure 1 is a plan view of the blank from which the box may be formed.

Figure 2 is a plan view of the blank showing sections thereof doubled against other sections of the blank.

Figure 3 is a plan view of the blank showing areas to which adhesive may be applied in the method of making the box.

Figure 4 is a plan view of the blank after opposite margins thereof have been folded against the top surface of the blank.

Figure 5 is the same as Figure 4 except areas are shown to which adhesive may be applied in the method of fabricating the box.

Figure 6 is a plan view of the blank after the final folding operation has been performed to produce a box in flat folded condition.

Figure 7 is a plan view of the box in set-up condition.

Figure 8 is an elevation of the box showing the end thereof when the box is in set-up condition.

Figure 9 is an elevation of the box, showing a side wall thereof, in set-up condition.

Figures 10 to Figure 18 inclusive illustrate a modified form of my invention wherein the locking elements are doubled against the upwardly facing surface of the bottom section of the box when the box is in set-up condition.

Figure 10 is the same as Figure 1.

Figure 11 is a plan view of the blank showing wall elements 9 doubled against the under surface of the blank.

Figure 12 is the same as Figure 11 except that adhesively treated areas $xa$ are shown.

Figure 13 is a plan view of the blank after opposite margins thereof have been folded against the top surface of the blank.

Figure 14 is the same as Figure 13 except that areas $y$ are shown to which adhesive may be applied in the method of producing the box.

Figure 15 illustrates the box after the last folding operation has been completed to produce this modified form of box in flat folded condition.

Figure 16 is a plan view of the box in set-up condition.

Figure 17 is an elevation of the box in set-up condition showing an end wall thereof.

Figure 18 is an elevation showing a side wall of the box in set-up condition.

Figures 19 to 26 inclusive illustrate another modified form of my invention wherein a box may be formed by simple folding operations.

Figure 19 is the same as Figures 1 and 10.

Figure 20 is the same as Figure 19 except that adhesively treated areas $xa$ are shown.

Figure 21 is a plan of the blank after the end margins thereof have been folded.

Figure 22 is the same as Figure 21 except that areas $ya$ are shown to which adhesive may be applied in the method of producing the box.

Figure 23 is a plan view of the box in collapsed condition after the final folding operation.

Figure 24 is a plan view of the box in set-up condition.

Figure 25 is an end elevation of the box in set-up condition.

Figure 26 is a side elevation of the box in set-up condition.

Figure 27:
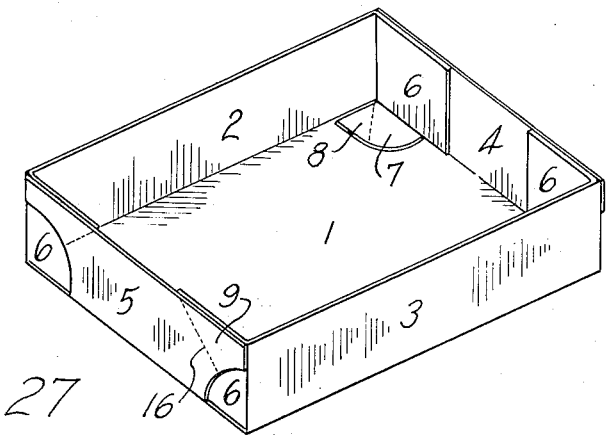

Figure 27 is a perspective view of the box shown in Figures 1 to 9 inclusive, tilted so as to show a portion of the interior thereof.

Figure 28:
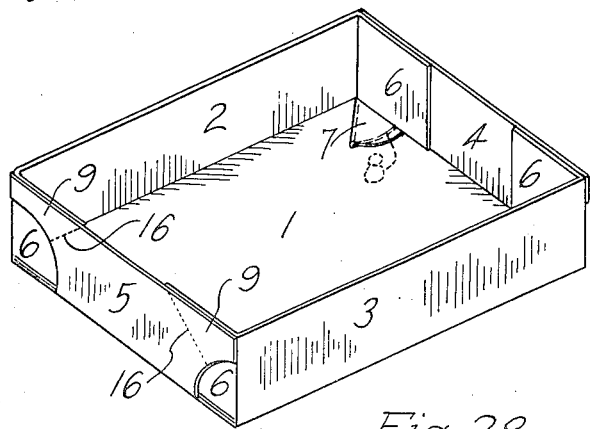

Figure 28 is a perspective view of the box shown in Figures 10 to 18 inclusive, tilted so as to show a portion of the interior therof.

Figure 29:
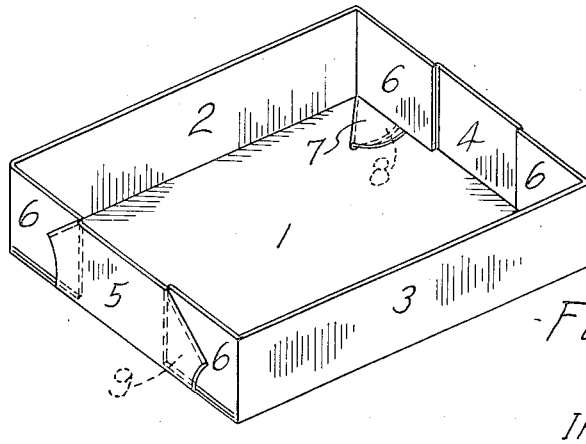

Figure 29 is a perspective view of the box shown in Figures 19 to 26 inclusive, tilted so as to show a portion of the interior thereof.

Similar reference characters indicate similar parts in all of the views.

Referring to Figure 1, there is illustrated a cut and scored blank of suitable material, such as paper box board, scored lines being represented by dotted lines 10, 11, 12, 13, 14, 15, 16 and 17, and cut lines being represented by full lines 18, 19, 20 and 21. The said dotted lines and cut lines effect a division of the blank to form a bottom section 1 for the box, side walls 2 and 3, end walls 4 and 5, end walls securing segment 9, corner sections 6, locking sections 7 and locking flaps 8.

In the method of producing the box in collapsed condition from a cut and scored blank (Fig. 1), locking flaps 8 are doubled against the top surface of locking sections 7, and the end wall securing segments 9 are doubled against the under surface of the corresponding end wall (Fig. 2). Predetermined areas $x$ (Fig. 3) are treated with adhesive so that when the blank is folded on lines 10, 11 and 14 the locking flaps 8 will contact the adhesively treated areas $x$ and become secured thereto. After the said folding operation the blank is in the condition illustrated by Figure 4. The upward facing surfaces of the corner sections 6 (Fig. 5) are then adhesively treated at predetermined areas y. The side walls 2 and 3 together with corner sections 6 are then folded on lines 12, 13 and 15, thus causing the end wall securing segments 9 to contact adhesively treated areas y to complete the box in collapsed condition (Fig. 6) ready to be instantly set up for use. Figures 7, 8, 9 and 27 illustrate the box in set-up condition.

When it is desired to set up the box for use, the end walls 4 and 5 are simply raised and bent outwardly, whereupon the locking section 7 in each corner of the box will automatically unfold on line 17 into position parallel with and to lie flat against the bottom of the box, thus automatically locking the corresponding corner section 6 in upright position; the said locking sections 7 and locking flaps 8 constituting keepers for the purpose.

The form of construction and the method of making the box illustrated in Figures 10 to 18 inclusive and Figure 28, is the same as that illustrated in Figures 1 to 9 inclusive, except that in the latter construction the locking flaps 8 are each doubled against the corresponding locking sections 7 in the first folding operation. In the construction shown in Figures 10 to 18 the locking sections 7 and locking flaps 8 lie flat against the bottom surface when the box is in collapsed condition, but when the box is being erected (Fig. 16) locking sections 7 will automatically fold on scored lines 17 to lie flat against locking flaps 8. In the method of producing this box from the blank 10, which is identical with the blank shown in Figure 1, end wall segments 9 are doubled against the bottom surface of the blank as shown in Figure 11. Adhesive is then applied to areas xa, shown in Figure 12, on the upper surface of the bottom section of the blank. Opposite marginal areas are then folded inwardly on scored lines 10, 11 and 14 as illustrated by Figure 13, thus causing locking flaps 8 to contact the adhesively treated areas xa. Adhesive is then applied to areas y of the corner sections 6 as shown in Figure 14. The end walls 2 and 3 together with the corner sections 6 are then folded on lines 12, 13 and 15 causing the adhesively treated areas y to contact the end wall segments 9 and become secured thereto, to complete the box in flat folded condition as illustrated by Figure 15. Figures 16, 17, 18 and 28 illustrate this box in set-up condition.

Figures 19 to 26 inclusive and Figure 29 illustrate still another modified form of my invention. This embodiment is produced from the same blank as that used in the two species first above described. The embodiment now to be described is very simple to manufacture due to the simple folding operations required. The blank shown in Figure 19 is the same as that shown in Figures 1 and 10. The first operation in producing this modified type of box is to apply adhesive to areas xa of the prepared blank as illustrated in Figure 20. Opposite margins of the blank are then folded on lines 10, 11 and 14 thus causing locking flaps 8 to contact the adhesively treated areas xa as illustrated by Figure 21. Adhesive is then applied to areas ya of the corner sections 6 as illustrated by Figure 22. The next operation is to fold the side wall sections 2 and 3 on lines 12, 13 and 15 thus causing the wall segments 9 to contact the adhesively treated areas ya of corner sections 6. This last folding operation serves to complete the box in flat folded condition as illustrated by Figure 23. Figures 24, 25, 26 and 29 illustrate this box in set-up condition.

While I have illustrated and described the preferred forms of construction and the preferred methods of carrying my invention into effect, these are capable of variation and modification without departing from the spirit of the invention.

I have shown the cut lines 18, 19, 20 and 21 (Figs. 1, 10 and 19) as the preferred form of cut to be provided in the blank, but these cuts may be varied without departing from my invention.

The scored lines 12 and 15 are shown as being in a straight line, as are scored lines 13 and 15, and 10 and 14, and 11 and 14, and lines 16 and 17. These score lines are illustrated in this way for simplicity, but in practice it may be desirable, when very thick material is used, to have some of the lines, in these several sets of lines, slightly out of line with each other, or at a slight angle with each other in order to compensate for the thickness of the material from which the box blank is made, and to permit folding the walls and corners of the box in flat folded condition so that the box may be set up without binding or cramping.

Instead of applying adhesive to areas x and y, and xa and ya, the adhesive may be applied directly to the end wall segments 9 and the locking flaps 8, without departing from the spirit of my invention.

Having described my invention, what I claim is:

1. A folding box made in collapsed condition, and when set up for use comprises, a bottom section, upright side walls and upright end walls, an end wall securing segment crease-hinged to each end edge of the end walls on a line radiating from the corresponding bottom corner of the box, a corner section at each corner of the box crease-hinged to an end edge of the side walls on a line radiating from the corresponding bottom corner of the box and being secured to and lying against the corresponding end wall securing segment, and a locking section crease-hinged to each corner section and lying against the bottom section, and a locking flap crease-hinged to each locking section on a line radiating from the corresponding bottom corner of the box and being secured to the bottom section of the box.

2. A folding box made in collapsed condition, and when set up for use comprises, a bottom section, upright side walls and upright end walls, an end wall securing segment crease-hinged to each end edge of the end walls on a line radiating from the corresponding bottom corner of the box, a corner section at each corner of the box crease-hinged to the ends of the side walls on a line radiating from the corresponding bottom corner of the box and being secured to and lying against the corresponding end wall securing segments, a locking section crease-hinged to each corner section and lying parallel with the bottom section, and a locking flap underlying each locking section and being crease-hinged to each locking section on a line radiating from the corresponding bottom corner of the box, each locking flap being secured to the bottom section.

RODERICK WM. HOAG.